UNITED STATES PATENT OFFICE.

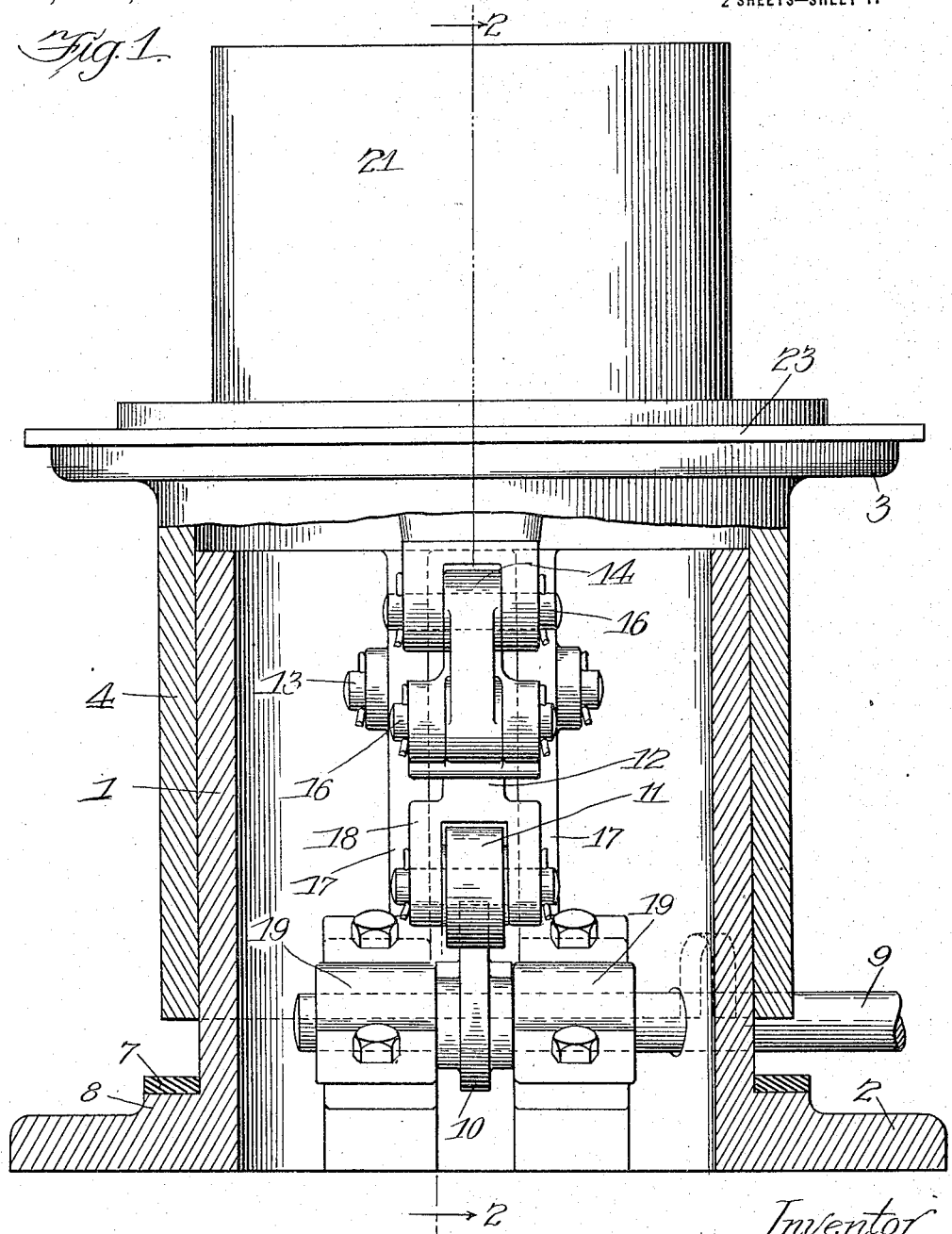

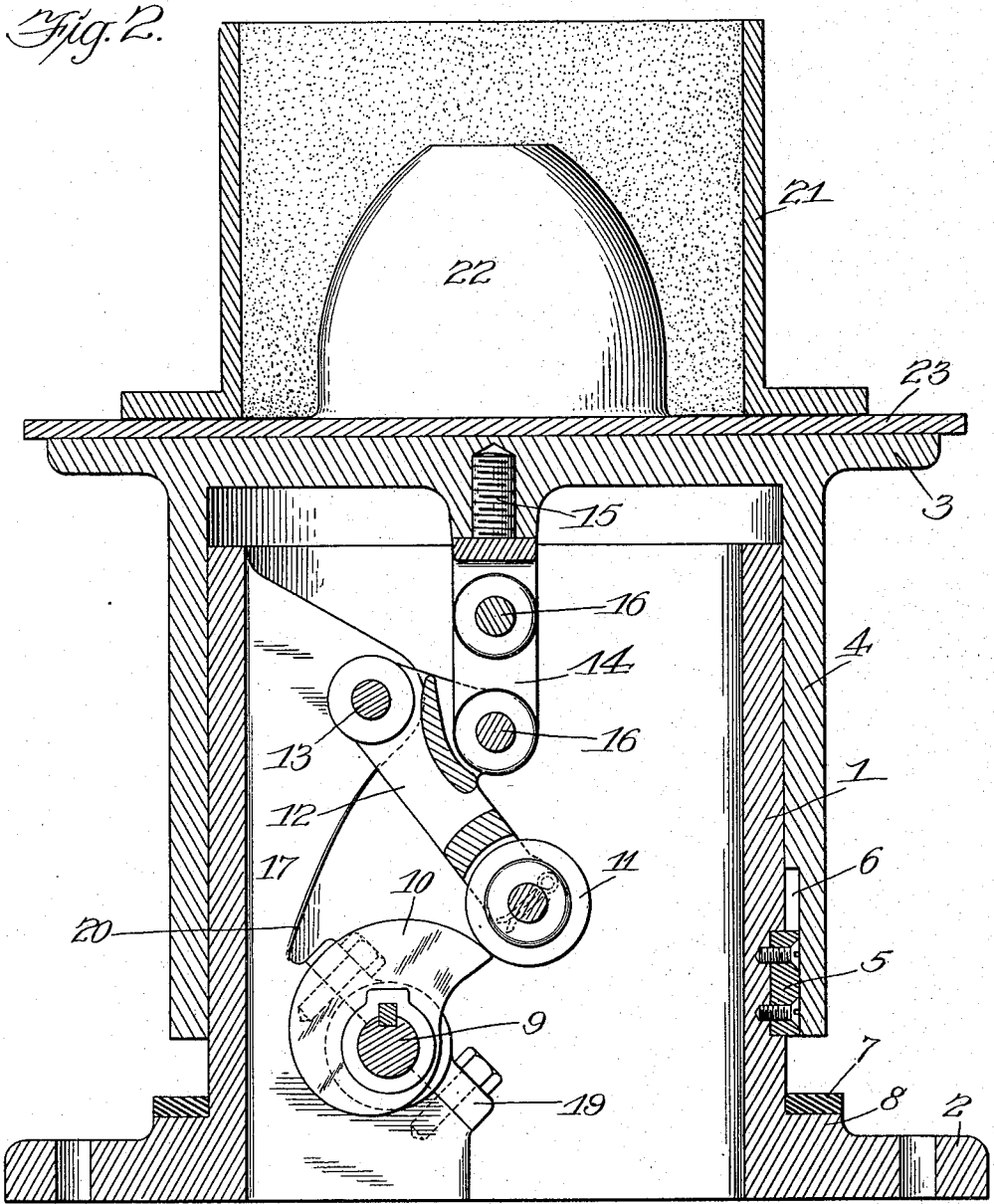

ALFRED V. MAGNUSON, OF CHICAGO, ILLINOIS, ASSIGNOR TO EMILY M. PRIDMORE AND HENRY A. PRIDMORE, OF CHICAGO, ILLINOIS.

MOLDING-MACHINE.

1,204,581.

Specification of Letters Patent.

Patented Nov. 14, 1916.

Application filed February 3, 1911. Serial No. 606,318.

*To all whom it may concern:*

Be it known that I, ALFRED V. MAGNUSON, a citizen of the United States, residing at Chicago, in the county of Cook and State of Illinois, have invented a certain new and useful Improvement in Molding-Machines, of which the following is a specification.

This invention relates to molding machines, and has for its object to provide a new and improved molding machine wherein the flask is rammed by a jarring motion.

The invention is illustrated in the accompanying drawings, wherein—

Figure 1 is a view in part section showing a machine embodying the invention; Fig. 2 is a sectional view taken on line 2—2 of Fig. 1.

Like numerals refer to like parts throughout the several figures.

A hollow stand 1 is supported upon a suitable base 2. A platform 3 is movably connected with the hollow stand 1 and provided with a guide 4 which engages the hollow stand. The hollow stand may be of any desired shape. If, for example, it is cylindrical the guide 4 may also be cylindrical. In this event some means is preferably provided for preventing relative rotation of the parts 1 and 4 without interfering with their relative endwise movement. As herein shown this is accomplished by means of a key 5 and a slot 6. The guide 4 is adapted when moved downwardly to engage a renewable part or washer 7 located on a shoulder 8 at the base of the hollow stand. Projecting into the hollow stand 1 is a shaft 9 mounted in suitable bearings within the hollow stand. Connected with the shaft 9 is a cam 10. This cam engages a roller or engaging part 11 connected with the bifurcated end 18 of a bell crank lever 12 supported by a pin 13. The bell crank lever is connected to a link 14 which link is connected by means of a threaded part 15 with the platform 3. As herein shown both arms of the bell crank lever are bifurcated or forked. The roller 11 is located between the forks at one end of the lever 12 and the link 14 is located between the forks at the other end. The threaded part 15 is also forked, the link 14 extending between these forks. The link is held in position by means of the pins 16. The support for the shaft 9 and the pin 13 may be arranged in any desired manner. As herein shown the stand 1 is provided with two inwardly projecting parts 17. The bottom portions of these parts support the bearings for the shaft, the shaft being held in place by the removable pieces 19. The tops of these projecting parts support the pin 13 and the bell crank lever 12. The inwardly projecting parts 17 are cut away at 20 between the bearings for the shaft 9 and the pin 13 so as to permit free movement of the lever 12. The flask 21, the pattern 22 and the pattern plate 23 are supported upon the platform 3 and may be held in place in any desired manner.

The use and operation of my invention are as follows: When it is desired to ram the flask such flask is placed in position upon the platform 3, and the shaft 9 is rotated so as to move the bell crank lever upwardly, thus carrying with it the platform 3 and the flask. When the cam 10 has revolved so as to be disengaged from the roller 11, the platform and flask are released and drop until the part 4 strikes the part 7, thus causing a jarring, which packs the sand about the pattern. As the cam again comes around it engages the roller 11 and lifts the plaform and flask and again releases them. It will thus be seen that a rapid jarring motion may thus be kept up until the sand has been properly packed about the pattern.

It will be noted that in this construction the mechanism is contained within the hollow stand 1, and is thus protected from the sand and from other exterior influences. It will further be seen that the machine is compact and simple and effective in its operation.

Since the guide 4 closely fits the hollow stand 1 and must move up and down therealong, it will be seen that in moving it up and down lateral pressure must be eliminated, or otherwise this lateral pressure would cause the guide to bind and interfere with the proper operation of the machine. I therefore provide a connection between the bell crank lever and the platform, having means for compensating for the lateral movement of the lever as it is lifted and lowered, due to the fact that the lever moves about a pivot, thereby preventing this lateral movement from producing lateral strains between the stand and the reciprocating device or guide 4.

I claim:

1. A molding machine comprising a hollow stand, a platform associated therewith, and platform actuating mechanism located within said hollow stand and comprising a cam, a pivoted lever above said cam, and engaging said cam so that when the cam is rotated the portion of said lever engaging said cam is moved in the arc of a circle, said lever being movably connected with said platform so as to apply pressure thereto, when moved, the point where the pressure from said lever is applied to said platform, and the portion of said lever engaging said cam being on the same side of a vertical plane through the pivotal point of said lever and parallel to the axis of said cam, so that the arc movement of said lever produces a rectilinear movement of said platform.

2. A molding machine comprising a hollow stand, a shaft extending into said stand, a cam within the stand connected with said shaft, a bell crank lever within said stand movably supported in position and having one end adapted to engage said cam, a platform with which the other end of said lever is pivotal so that the platform is moved up and down as the lever is moved.

3. A molding machine comprising a hollow stand, two separated inwardly projecting parts within said stand, a shaft projecting into the stand and mounted on bearings connected with said parts, a lever within said stand and movably supported upon said parts, a platform associated with the stand and connected with said lever, and means for moving said lever so as to give the stand a jarring motion.

4. A molding machine comprising a hollow stand, an exterior reciprocating device guided on the outside of said stand, a platform carried by said reciprocating device, a cam mounted within the stand, a lever pivotally connected with said stand above said cam one end of said lever engaging the cam, a connection between the lever and the platform for compensating for the lateral movement of said lever and preventing said lateral movement from producing lateral strains between said stand and said reciprocating device.

5. A molding machine comprising a hollow stand, a projecting part integral with said stand and projecting inwardly, a bearing attached to said projecting part, a shaft in said bearing, a cam on said shaft, a pivoted lever pivoted to said inwardly projecting part and engaging said cam, a link connected with said lever, a platform movably connected with said stand and a connection between said platform and said link.

6. A molding machine comprising a hollow stand, two separated bearings connected with said stand, a shaft mounted in said bearings, a cam on said shaft intermediate said bearings, a platform adapted to reciprocate on said stand, a lever connected with said stand, a link connecting the lever and platform and an intermediate thrust-bearing part between the lever and the cam and adapted to engage both of them.

7. A molding machine comprising a hollow stand open at its upper end, a platform above said hollow stand, a guide connected with said platform and surrounding said hollow stand, a projecting part connected with said platform and projecting into said hollow stand, a bell crank lever contained in said hollow stand and pivotally connected thereto, a link in said stand connecting the bell crank lever with the projecting part on the platform, and free to move laterally, a shaft projecting into said stand and a cam on said shaft and contained in said stand, said cam engaging the bell crank lever.

8. A molding machine comprising a hollow stand, a bell crank lever contained within said stand, a shaft projecting into said stand, a supporting device for said bell crank lever and said shaft, said supporting device connected with the inner face of the stand and projecting inwardly from said face, a cam on said shaft adapted to engage said bell crank lever, a platform carried by said stand and a connection between the bell crank lever and the platform.

9. A molding machine comprising a platform, a hollow projecting part connected with said platform, a stationary hollow stand upon the exterior face of which said part is adapted to reciprocate, two separated projecting parts connected with the inner face of said stand, a shaft projecting into said stand and supported upon said separated projecting parts, a cam connected with the shaft and located between said separated projecting parts, a lever having one end projecting between said separated projecting parts and pivotally connected therewith, the other end of said lever engaging said cam and a laterally movable connecting device connecting the lever with said platform.

Signed at Chicago, Illinois, this 30th day of January, A. D. 1911.

ALFRED V. MAGNUSON.

Witnesses:
EDNA K. REYNOLDS,
MINNIE M. LINDENAU.

Copies of this patent may be obtained for five cents each, by addressing the "Commissioner of Patents, Washington, D. C."